United States Patent
Sabol et al.

(10) Patent No.: US 7,141,888 B2
(45) Date of Patent: Nov. 28, 2006

(54) ANTIROTATIONAL STRUCTURES FOR WAVE ENERGY CONVERTERS

(75) Inventors: Thomas Sabol, Lawrenceville, NJ (US); David B. Stewart, Cranbury, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 0 days.

(21) Appl. No.: 11/080,319

(22) Filed: Mar. 15, 2005

(65) Prior Publication Data

US 2005/0237775 A1  Oct. 27, 2005

Related U.S. Application Data

(60) Provisional application No. 60/553,666, filed on Mar. 16, 2004.

(51) Int. Cl.
*F03C 4/00* (2006.01)
(52) U.S. Cl. ............................. 290/53; 290/42; 310/12
(58) Field of Classification Search ..................... None
See application file for complete search history.

(56) References Cited

U.S. PATENT DOCUMENTS

| 852,232 | A | * | 4/1907 | Kohler | 60/398 |
| 3,645,103 | A | * | 2/1972 | Laffont | 405/202 |
| 4,378,178 | A | * | 3/1983 | Roach | 405/224 |
| 5,167,786 | A | * | 12/1992 | Eberle | 204/228.2 |
| 6,864,592 | B1 | * | 3/2005 | Kelly | 290/42 |
| 2004/0163389 | A1 | * | 8/2004 | Gerber et al. | 60/595 |

* cited by examiner

*Primary Examiner*—Joseph Waks
(74) *Attorney, Agent, or Firm*—Henry I. Schanzer

(57) ABSTRACT

A WEC includes a non-circular main central column positioned within a like non-circular central opening of a shell to contain the central column and prevent rotation or twisting of the shell relative to the column. In a particular embodiment, the central column is multi-sided (e.g., a square) and the central opening of the shell is likewise multi-sided (e.g., square). The facing sides of the column and shell are parallel to each other facilitating the layout of the components of a linear electric generator (LEG) between the facing sides and ensuring good magnetic coupling between the components of the LEG over the length of travel of the shell and column.

11 Claims, 11 Drawing Sheets

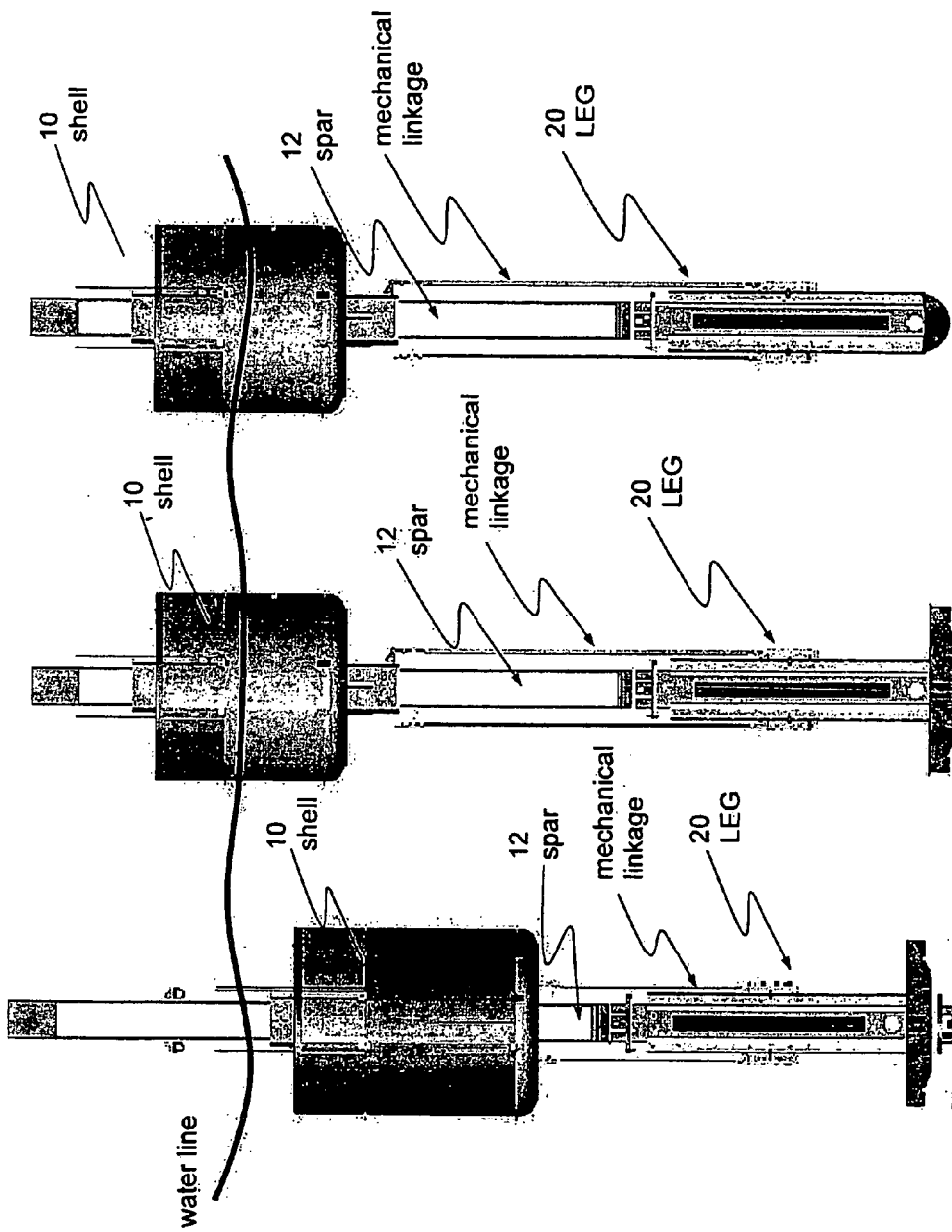

FIGURE 5A     FIGURE 5B

ANTIROTATIONAL STRUCTURES FOR WAVE ENERGY CONVERTERS

CROSS REFERENCES TO RELATED APPLICATIONS

This application claims priority from provisional patent application Ser. No. 60/553,666 titled Wave Energy Converters (WECs) with Linear Electric Generators (LEGs) filed Mar. 16, 2004, the teachings of which are incorporated herein by reference.

BACKGROUND OF THE INVENTION

This invention relates to apparatus, systems and methods for converting energy present in ocean surface waves into electric energy.

Known wave energy converter (WEC) systems for capturing ocean surface wave energy include: (a) a first component (also referred to herein as a "shell" or "vessel" or "float") which, when placed in a body of water, is designed to move up and down, generally, in phase with the waves in the water and thus absorb and/or release energy; (b) a second component (also referred to herein as a "shaft", "spar", "column" or piston) which is either stationary or moves generally out of phase relative to the waves and the first structure; and (c) a power take off (PTO) device coupled between the first and second components which, in response to the relative motion between the first and second structures, is designed to produce electrical energy.

Due to the forces of the waves there tends to be twisting and turning (rotation) of the shell relative to the column when the WEC is in the water. That is, the body of water applies forces to the shell and column which tend to cause the shell to rotate or twist about the column (in addition to the desired vertical, up and down, motion). The twisting or rotational motion is potentially damaging and is highly undesirable.

A prior art solution for preventing twisting of the column 12 relative to the shell 10 is shown in FIG. 1. The top of the column is shown connected to a cross-shaped buffer 103 with vertical anti-rotational pipes 101 being located between the arm of the cross, at or close to their junction, to prevent rotation. Incorporating such restraining members adds to the complexity and cost of the design and still allows for some twisting along the column, if the anti-rotation mechanism is only introduced at one end of the column.

SUMMARY OF THE INVENTION

A WEC embodying the invention includes a shell and a column with a power take-off (PTO) device connected between the shell and the column. The shell and column are shaped such that, when placed in a body of water and in response to waves in the body of water, rotational and/or twisting motion between the shell and the column is inhibited while allowing vertical motion of the shell relative to the column.

In systems embodying the invention, there is included a main central column which is non-circular (i.e., it may be oblong or multi-sided) and which is positioned or fitted within the central opening of a shell which is shaped to contain the central column and prevent rotation or twisting. The non-circular inner wall of the shell is shaped to be complementary in structure to the non-circular outer wall of the column whereby the shell can not readily rotate relative to the column.

In a particular embodiment, the central column is a square column and the central opening of the shell is likewise square. This structure provides four plane surfaces, extending along the column, facing four corresponding plane surfaces extending along the inner wall of the shell. These opposing surfaces are parallel to each other and can be so maintained over a wide operating range, as the shell moves, up and down, relative to the column.

A significant aspect of the inventive structure is that it facilitates the use of a PTO which includes a linear electric generator (LEG) system designed to produce electrical energy, directly, in response to the relative motion between the shell and the column. The LEG system includes a permanent magnetic assembly (PMA) and an induction coil assembly (ICA) which perform better when formed between and along parallel surfaces whose dimensions and spacing can be maintained relatively constant. This feature aids to maintain good and efficient electromagnetic coupling of the components (PMA and ICA) of the LEG, ensuring more efficient operation.

Typically, in WECs including anti-rotational structures, one of the PMA and ICA is located on, or in, or attached to, the shell and moves as the shell moves; and the other one of the PMA and ICA is located on, or attached to, the column and either moves as the column moves or remains stationary if the column is stationary. Relative motion between the shell and column, when placed in a body of water and in response to waves in the body of water, causes the attached (or mounted) PMA and ICA assemblies to be driven, vertically, past each other, in response to motion of the waves, resulting in the generation of output voltages which are a function of the relative vertical motion while preventing rotational and twisting motion.

The parallel surfaces provided by the shell's inner walls and the column's outer wall facilitate the incorporation of a guide and bearing system which maintains the relative alignment of the magnetic and induction coil assemblies and the spacing between them.

The column may be multi-faceted (star shaped or spoke like) and the central opening of the shell may also be correspondingly multi-faceted to provide anti-rotational surfaces which can also be used for the placement of LEG components.

BRIEF DESCRIPTION OF THE DRAWINGS

In the accompanying drawings (which are not drawn to scale) like reference characters denote like components.

FIGS. 2C1, 2C2, 2C3 are diagrams of WECs with a square column and shells with square central openings, as per the invention;

FIGS. 5A, 5B and 5C are highly simplified diagrams illustrating the layout of components of a LEG suitable for use in structures embodying the invention.

DETAILED DESCRIPTION OF THE INVENTION

Figure 2A:
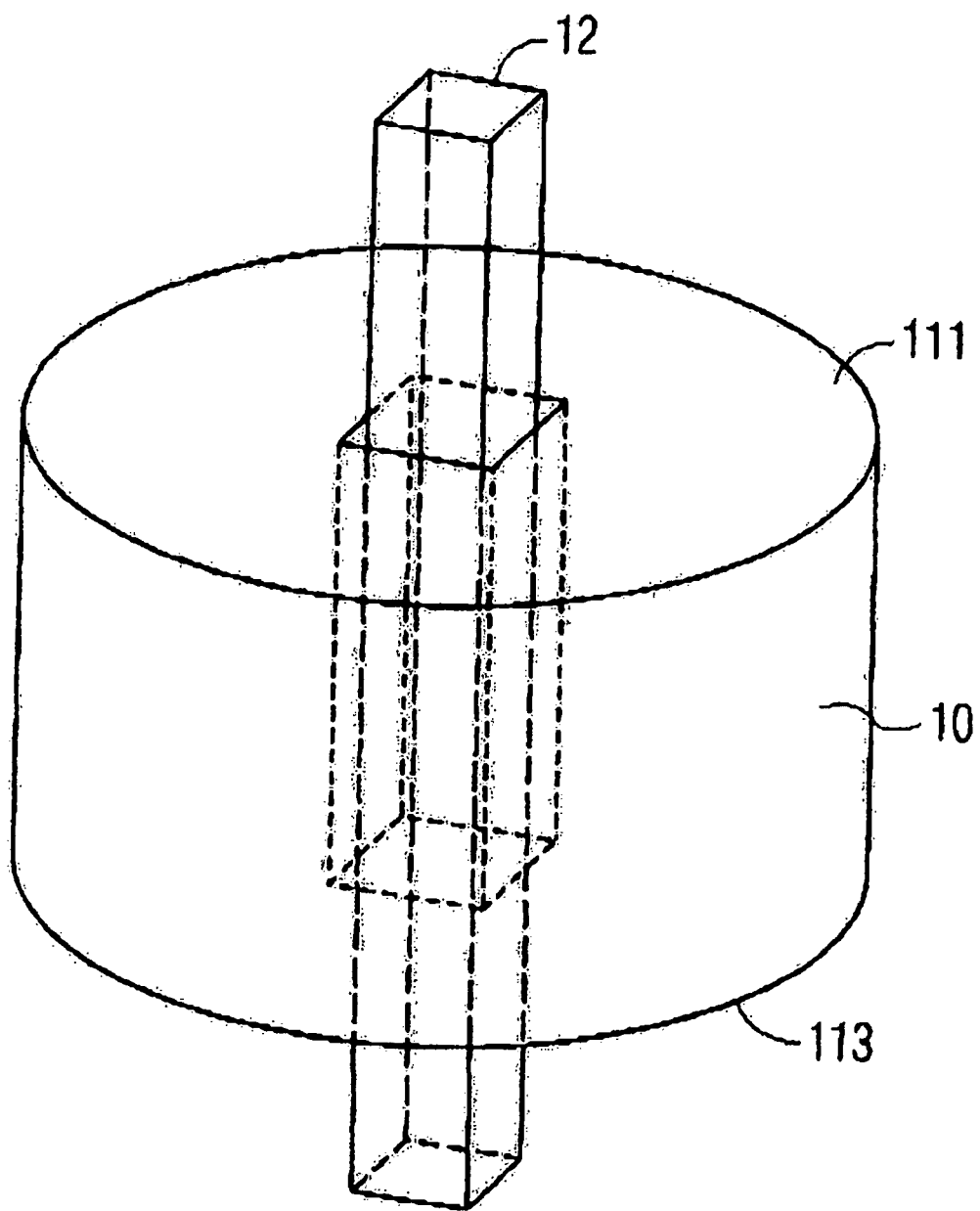
FIG. 2A is a diagram illustrating the construction of an anti-rotational column and a corresponding float, in accordance with the invention.
Figure 2B:
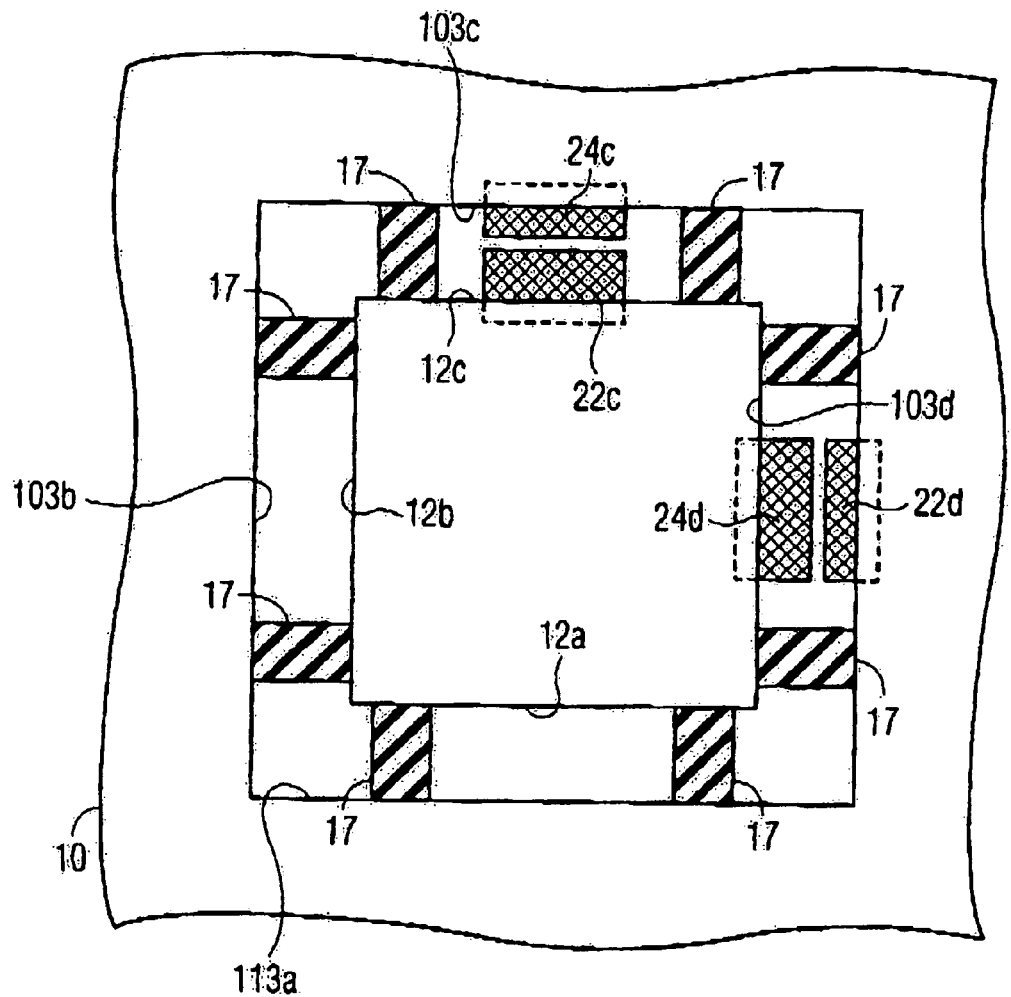
FIG. 2B is a cross-sectional diagram illustrating the layout of an induction coil assembly and a permanent magnet assembly for the structure of FIG. 2A.

Referring to FIG. 2A there is shown a square elongated column 12 extending above the top 111 of a shell 10 and below the bottom 113 of the shell. The shell 10 has a central opening shaped to correspond in a complementary manner to the walls of the column to enable the column 12 to fit through the central opening of the shell 10, whereby the shell and column can move vertically, up and down, relative to each other, while preventing any rotational motion. As shown in FIGS. 2A and 2B, the sides of the column (12a, 12b, 12c, 12d) define plane surfaces extending along the column. Corresponding to each side (12a, 12b, 12c, 12d) of the column is a side (103a, 103b, 103c, 103d) of the inner wall of the shell, each inner shell side defining a plane surface which is generally parallel to the corresponding side or face of the column. This structure enables the shell and column to slide past each other while allowing virtually no rotational movement between the shell and column.

FIG. 2B is a partial top cross-sectional view of the square column 12 located within the central opening of the shell 10. Low-friction bearing pads 17 are placed between the column and the inner wall 103 of the shell. The low-friction bearings pads 17 ensure that the column can move smoothly up and down while maintaining a relatively constant spacing between the shell and the column. An induction coil assembly (ICA) 24c is shown attached along the inner wall 103c of the shell and a permanent magnetic assembly (PMA) 22c is shown attached to the outer wall 12c of the column 12. Alternatively, an ICA 24d is shown connected to the outer wall 12d of the column and a PMA 22d is shown attached to the inner wall 103d of the shell 10. Thus, one of a PMA and an ICA may be connected (attached or mounted) on one of the inner wall of the shell and outer wall of the column and the other one of the PMA and the ICA is connected (attached or mounted) to the other one of the inner wall of the shell and outer wall of the column. Thus, a PMA (or ICA) is attached to a portion of the column facing the internal shell wall 103i on which is mounted an ICA (PMA). The plane surface of the column and the corresponding plane surface of the internal wall of the shell can be made to be parallel to each other for an extended length. This permits the PMA to pass along the coil assembly with a relatively well controlled gap over a predetermined length of travel, defining the operating range.

Figure 1:
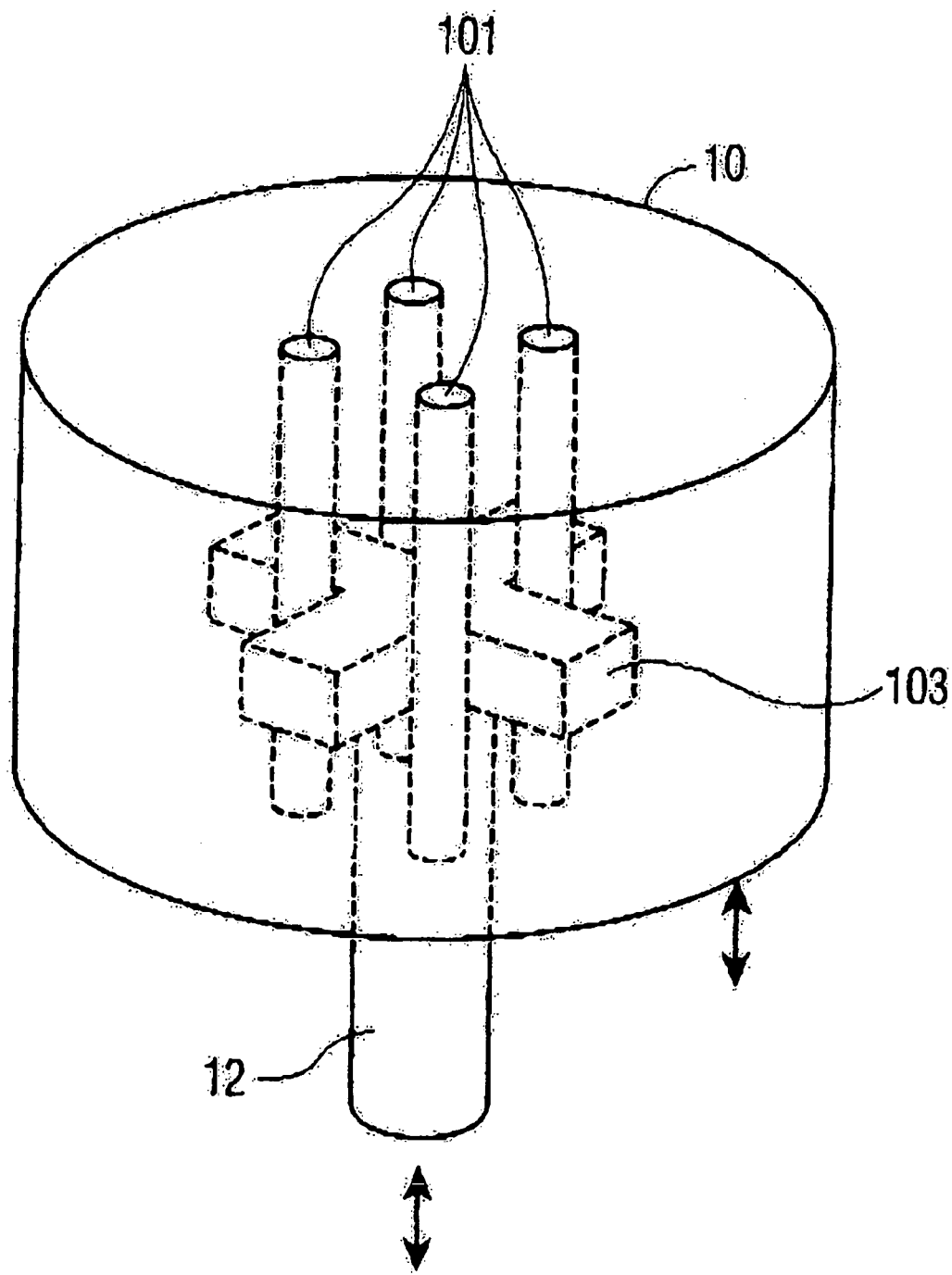
FIG. 1 is an illustrative diagram (not to scale) of a prior art structure for preventing the shell and column of a WEC from rotating relative to each other.

FIGS. 2C1, 2C2, 2C3 show WECs which are formed with a square column and a shell with a square central opening. These WECs may include one, or more, power take off (PTO) device which includes a linear electric generator (LEG) device 20 connected between the "shell" and the "spar". FIG. 2C1 shows a neutrally buoyant shell 10 typically submerged below the surface of the ocean with a tethered or anchored vertical column (spar) 12. FIG. 2C2 shows a FIG. 2D (like 2B) shows the four internal walls (103a, 103b, 103c, 103d) of the shell 10 and the buoyant shell typically floating at the surface of the ocean also with a tethered or anchored vertical column (spar) 12. FIG. 2C3 illustrates a dual wave energy absorber WEC where the shell 10 and the spar 12 move relative to each other, the shell generally in phase with the waves and the spar tending to move out of phase with the shell and/or the ocean waves. corresponding outer facets (12a, 12b, 12c, 12d) of the column 12. Note that either: (a) a permanent magnetic assembly (PMA) 22 may be attached to a wall of column and an induction coil assembly (ICA) 24 may be attached to the corresponding inner wall of the shell; or, alternatively, (b) an ICA may be attached to the column and a PMA may be attached to the corresponding inner wall of the shell.

Figure 2D:
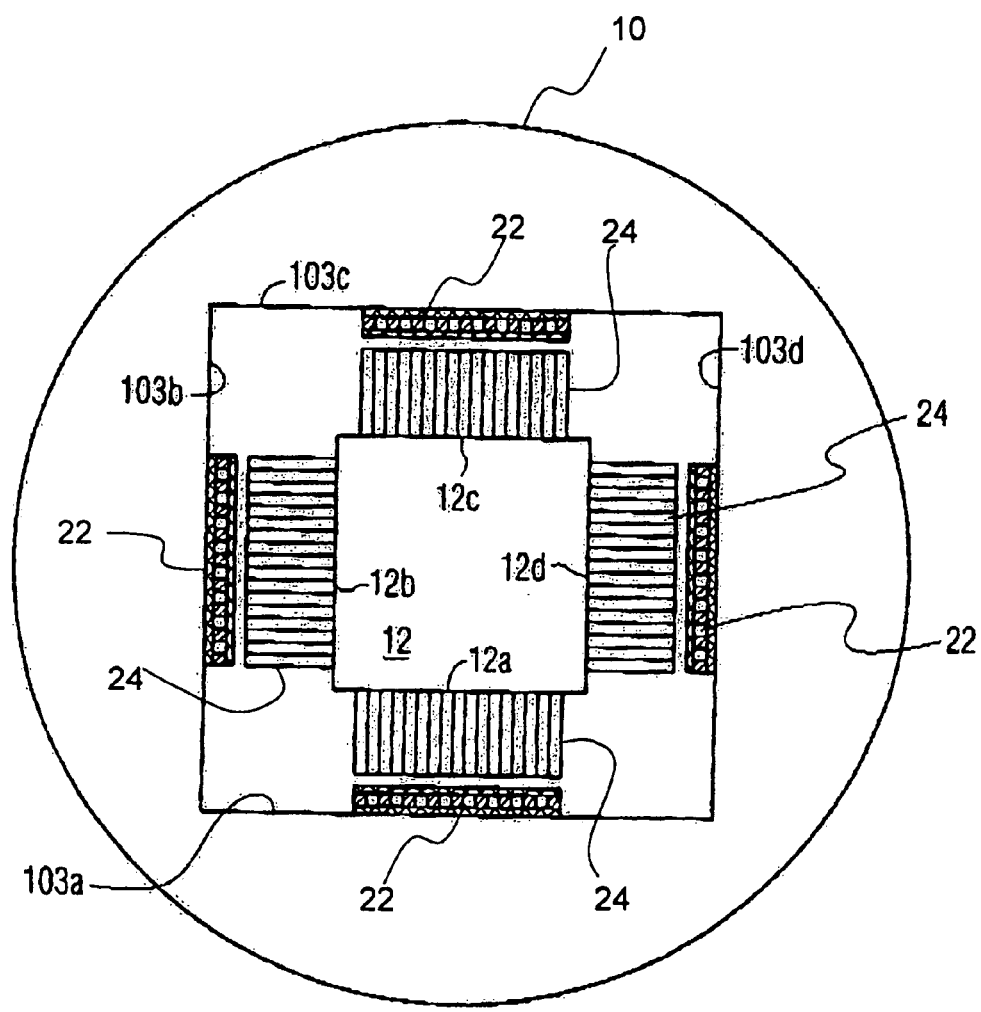
FIG. 2D is a cross-section illustrating the positioning of induction coil and magnet assemblies along the outer plane surfaces of a column and the inner surfaces of a shell.

FIG. 2D shows a high-force, high-power LEG cross-section. The unit includes four LEG assemblies, each with a (moving) PMA 22 and a (stationary) stator ICA 24. The LEG is configured in a box configuration for two reasons. First, the large magnet-stator attractive force is somewhat negated if the magnets are held apart by a support structure. Second, the overall length of the quad-LEG may be made one-fourth the length of a single LEG. Other configurations may be considered. For example, the LEG may be implemented as one or more back-to-back magnet-stator assemblies.

Figure 2E:
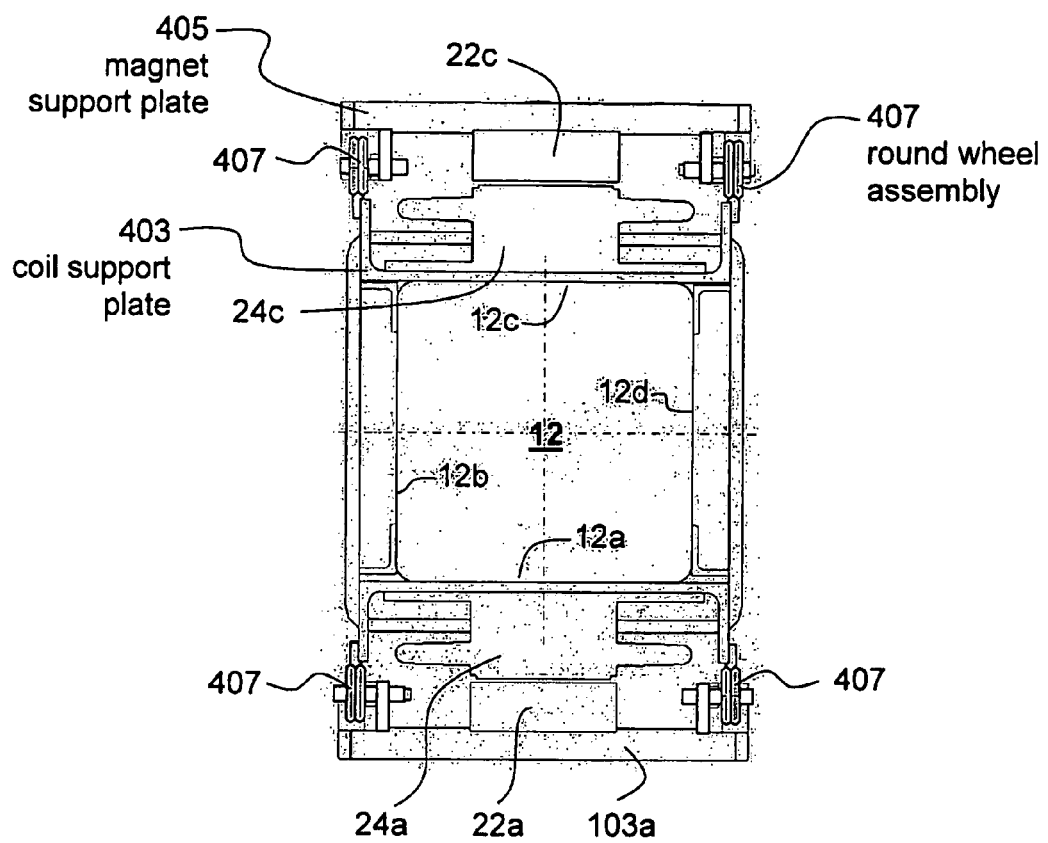
FIG. 2E is a diagram illustrating a mechanism for controlling the motion and spacing of the column and shell and the LEG attached to the WEC.

FIG. 2E shows some of the details of the mounting of LEGs mounted on two sides of a square column. A PMA 22c is shown attached by means of a magnetic support plate 405 to the inner wall 103c of the shell. A corresponding ICA 24c (also referred to as a stator) is attached by means of a coil support plate 403 to the outer wall 12c of column 12. In FIG. 2E wheeled assemblies 407 are shown connected between the PMA and ICA support plates (403, 405) to enable: (a) smooth movement of the shell relative to the column; and (b) for maintaining the gap spacing between the components (shell and column and PMA and ICA) relatively constant over the full length of travel. The significance of this structure is further described below.

Figure 3A:
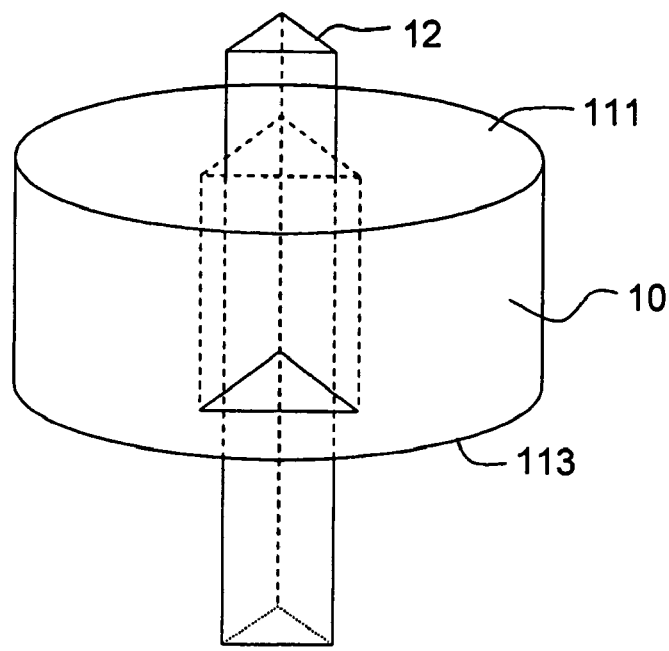
FIG. 3A is a diagram illustrating the construction of another anti-rotational column and a corresponding float in accordance with the invention.
Figure 3B:
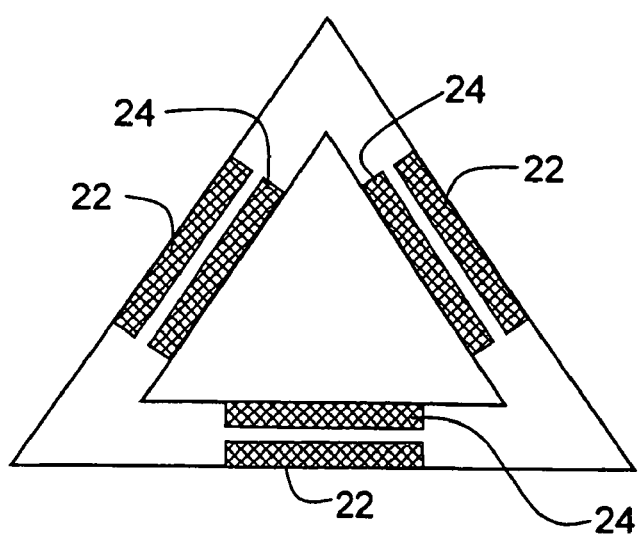
FIG. 3B is a diagram illustrating the layout of an induction coil assembly and a permanent magnet assembly for the structure of FIG. 3A.

FIGS. 3A and 3B show, respectively, a triangular column 12 mounted within a shell 10 having a corresponding central cut out and a partial cross section of the column and shaft showing permanent magnetic (22) and induction coil (24) assemblies.

Figure 4:
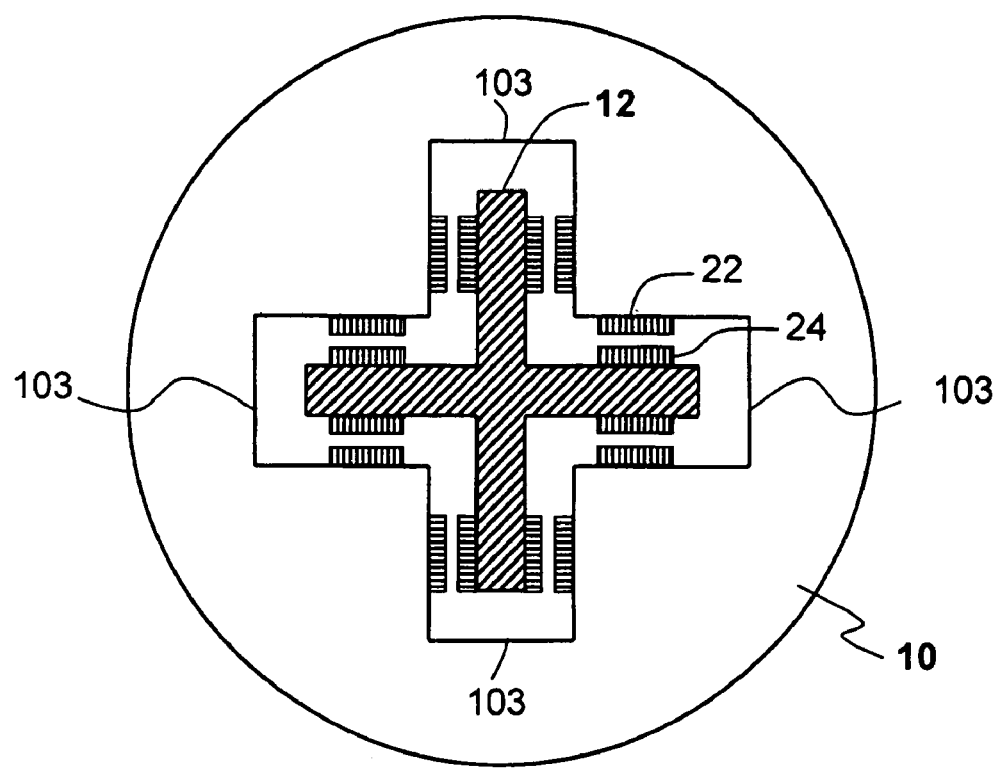
FIG. 4 is a diagram illustrating the construction of a cross shaped column and a corresponding cross shaped central shell opening in accordance with the invention.

FIG. 4 shows that the outer surface of the column and the central portion of the shell may be cross-shaped to provide extensive parallel surfaces along which permanent magnetic and coil assemblies may be attached while at the same time providing a significant anti-rotational configuration.

FIGS. 2–4 illustrate the mounting of a LEG assembly on multi-sided column and shell structures which are designed to provide anti-rotation (i.e., to prevent rotation of the shell relative to the column) while simultaneously providing parallel surfaces between the shell and the column to enable the formation of a more efficient LEG;

The various figures illustrate that, in accordance with the invention, the central column of the WEC may be multi-sided (e.g., a square column having 4 sides), with the sides of the inner wall of the shell, facing the column, having faces parallel to each side of the central column, and that a LEG assembly may be located between each side of the central column and a corresponding face of the inner shell wall.

Wave energy converters (WECs) suitable for practicing the invention may include many different types of systems.

In general, any WEC which includes first and second structures (e.g., a shell and a spar) which, in response to forces such as those produced by ocean waves, move relative to each other may be suitable for practicing the invention. In accordance with the invention, a PTO, which includes a linear electric generator (LEG) 20, may be coupled between the first and second structures to convert their relative motion into electrical energy directly. Furthermore, in accordance with the invention, the PTO may be placed in many different locations, providing a high degree of freedom in the design of the physical configuration of the system.

Although the invention may be used with any type of PTO, the use of a linear electric generator (LEG) is highly desirable as the WEC's power take-off (PTO) device for a number of reasons. The projected efficiency of the all-electric system is estimated to be above 90% at rated force and velocity. This efficiency is well above the less than 80% efficiency of existing hydraulic-electric system. The hydraulic components are also expensive, have limited life and reliability, and present installation and maintenance challenges.

A significant benefit of the LEG is that it enables implementation of significant improvement in efficiency and survivability features. One aspect of the invention is that it enables implementing an active impedance matching system (AIMS) which includes feeding back power to the buoy (WEC) during a portion of each wave cycle. It has been found that using an hydraulic system for feed back is difficult to achieve on a long-term basis. The life of a hydraulic motor, when operated as a pump, is shortened significantly. The LEG, on the other hand, can be operated as a motor and/or as a generator, depending on the direction of current flow and applied mechanical force. Thus, the LEG enables active impedance matching, with a resultant increase in WEC efficiency.

A LEG can also be configured with essentially unlimited stroke. This feature has enormous benefit in terms of WEC structural design and survivability. In existing WEC designs, the impact forces, not the wave forces, control the structural design. Also existing WECs have limited stroke, driven by the finite length of the hydraulic cylinder or other mechanical PTO devices, which requires a mechanical system with end stops and dampers to absorb the impact loads. The anchor, universal joint, and column must also be designed to handle these loads. In a system embodying the invention, without these end stops, the force on the structural components is limited to that exerted by the power take-off device (the LEG in this case). With the addition of copper or aluminum plates at the end of normal power take-off stroke, passive damping (braking) can be implemented. This damping serves to take energy out of the buoy in storm conditions. Thus, the structural design of a WEC using LEG systems is greatly simplified.

Advantages of using linear electric generators (LEGs):
1-eliminate hydraulics or other mechanical translation devices-this should result in significant gain in efficiency since there are substantial power (efficiency) losses associated with hydraulic and mechanical translation conversion systems.
2-the cost of LEG systems should be cheaper than hydraulic pump/generator systems.
3-LEG gain in efficiency more reliable than hydraulic systems.
4-LEG systems allow for bi-directional power flow operation The WECs are intended to be placed in a body of water (e.g., an ocean) and the waves cause the shell 10 to move up and down relative to the central column (piston or spar) 12. The up and down motion of ocean waves applies a force to the shell 10, causing up and down motion of the shell relative to the spar 12 which may be a stationary member of the wave energy converter system. Alternatively, the spar 12 may also be a moving member, but whose movement tends to be out of phase with the motion of the shell.

The LEG assemblies 20 normally include a permanent magnet (PM) assembly 22 and an induction coil assembly, 24. In accordance with the invention, the permanent magnet assembly (PMA) 22 and the induction coil assembly (ICA) 24 need not be encased in a common sealed housing. Separately enclosed magnet and induction coil assemblies provide options not possible with known common-housing linear electric machines. The LEG assemblies can be placed above, below, on the inside or on the outside of a wave energy converter shell. The permanent magnets 22 are mechanically coupled to one of the shell 10 and column of the WEC and the induction coil assemblies 24 are affixed to the other one of the shell and column 12.

The ICA and PMA assemblies (24, 22) are positioned relative to each other so that there is a small gap between them to ensure strong electromagnetic coupling between the coils and the magnets while allowing "unimpeded" physical linear (vertical) motion relative to each other. That is, relative movement is unimpeded except for the forces exerted due to the desired power generation and power extraction. In all configurations there is relative vertical movement between the coils and the magnets as the shell moves up and down. However, rotational or twisting movement is inhibited.

In general, the instant invention resolves a problem which exists in that there are twisting and turning forces between the shell 10 and the central column 12 tending to cause the shell to rotate relative to the column (or vice-versa). In systems embodying the invention, the central column 12 is shaped such that it has a multiplicity of sides (e.g., three or more sides) with the column mounted through the center of the shell and the inner wall or core section of the shell having a complementary structure to the sides of the column. Instead of multiple sides the column could be made oblong (i.e., non-circular) and the central shell opening could be made with a complementary corresponding structure. The inner walls 103 of the shell 10 may be formed having parallel surfaces to the outer walls or sides of the column. For the "anti-rotational" type of design the tendency of the shell to rotate relative to the column has been significantly reduced, if not eliminated.

Also, parallel and facing (opposite) plane surfaces are formed which make it easier to position, locate and hold LEG assemblies. The ICA 24 can be mounted on one of the outer side(s) of the column 12 and the inner wall(s) 103 of the shell and the PMA 22 can be mounted on the other one of the outer side(s) of the column 12 and the inner wall(s) 103 of the shell. As discussed, forming the LEG assemblies along parallel surfaces aids in the forming of LEG assemblies whose dimensions and movements are easier to control resulting in a more reliable and more efficient LEG.

Figure 5C:
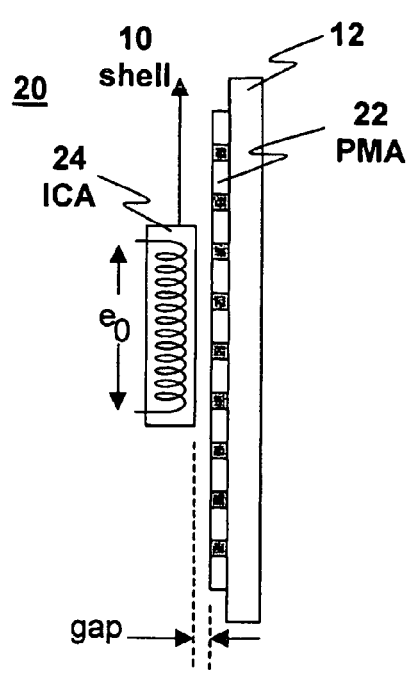
Figure 5C:
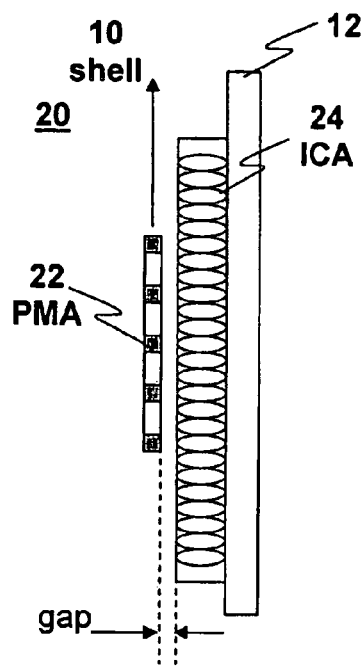
Figure 5C:
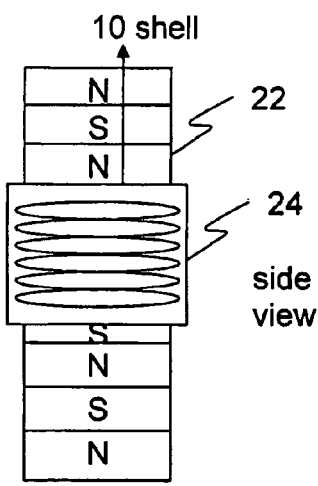
Figure 6A:
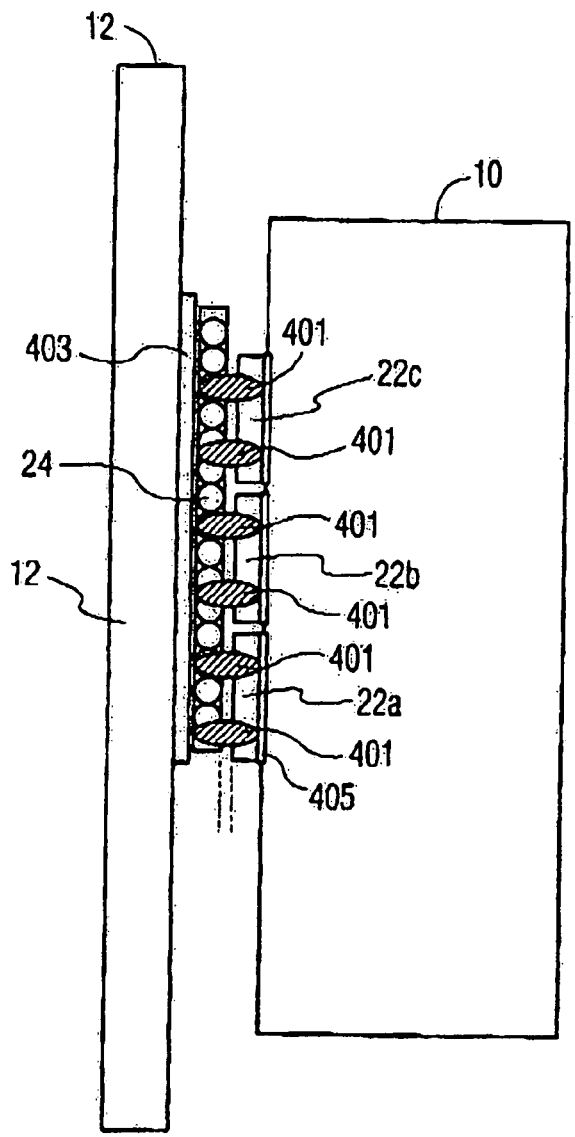
FIGS. 6A–6E illustrate that the plane parallel surfaces of the shell and column formed in accordance with the invention facilitate maintaining the gap between the components of the LEG relatively constant.
Figure 6B:
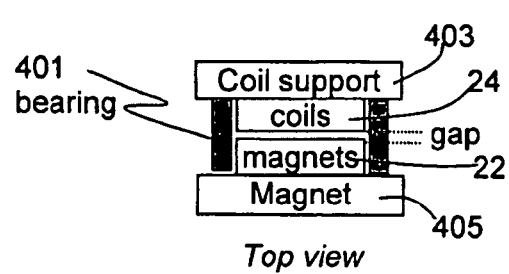
Figure 6C:
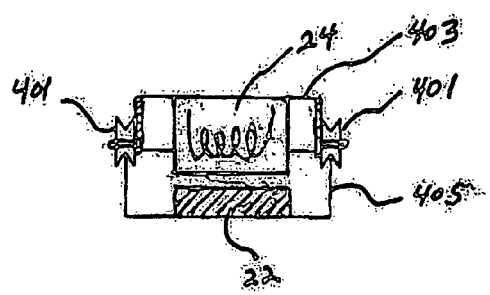
Figure 6D:
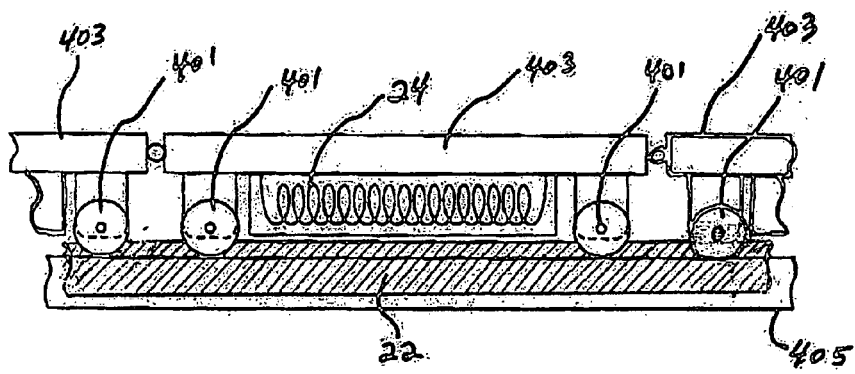
Figure 6E:
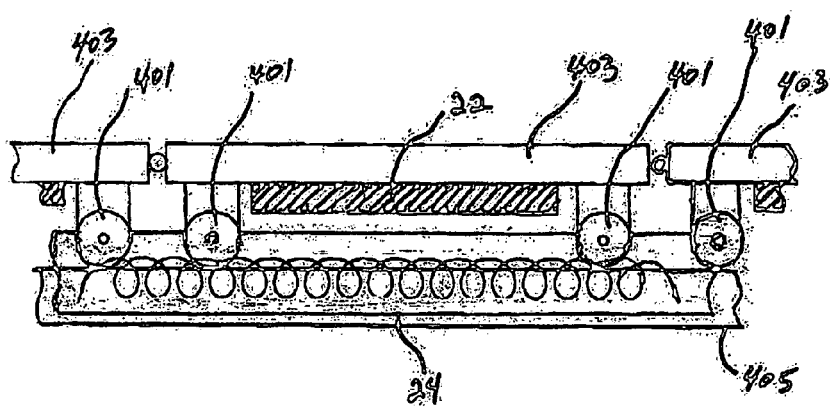

Different aspects of the configurations of the LEG 20 are shown in FIGS. 5A and 5B. In FIG. 5A, the PMA 22 is shown located along the column 12, (which is assumed to be, but need not be) stationary, while the ICA 24 is connected to the shell 10 and moves up and down across the PMA 22, as the shell 10 moves up and down relative to the shaft 12. Note that an air gap (it could be a liquid gap) is maintained between the two assemblies, 22 and 24. In FIG. 5B, the ICA 24 is shown located along the shaft 12 (which is assumed to be, but need not be, stationary), while the PMA 22 is connected to the shell 10 and moves up and down across the ICA 24, as the shell 10 moves up and down relative to the shaft 12. Note that FIG. 5C shows a side view of the ICA 24 being propelled by the shell 10 across the PMA 22.

In configurations of interest, wave action forces the shell to move up and down, causing relative motion between the induction coils and the permanent magnets. Note that the coil and magnetic assemblies are designed to pass each other with the small "gap" between the assemblies being maintained relatively constant to ensure good electromagnetic coupling at all times. In this way, mechanical force and motion are converted to electrical current and voltage in an efficient manner.

For a configuration with a square column and a square central opening in the shell (e.g., FIGS. 2B, 2C1, 2D), connected or mounted to each of the 4 sides of the column 12 is a LEG support assembly with a coil assembly 24 mounted on each LEG support 123. Opposite each coil assembly there is located a magnetic assembly 22 separated from the coil assembly by an air gap. Each magnetic assembly is mounted on a magnet backing plate which is attached to a LEG support. The individual LEG supports may be interconnected with an optional LEG out support to contain the leg assemblies.

A problem exists in maintaining the "gap" distance between the induction coil assembly and the magnetic assembly relatively constant as the two assemblies passes each other. A problem also exists in the manufacture of long magnetic assemblies for use in the contemplated systems. FIGS. 6A, 6B, 6C, 6D and 6E illustrate how the gap between the coil assembly and the magnetic assembly may be maintained over the relative long distances which the magnets and/or coils may have to travel relative to each other under adverse conditions. Two features of the design shown in these figures should be noted. (1) the magnets are divided into relatively small segments (e.g., 22a, 22b, 22c, etc. . . . ); and (2) the various segments are separated and supported by bearings, 401. This construction eliminates the need to form a long unitary magnetic assembly having precise measurements and eases the requirement that the very precise and small gap be maintained between the long unitary magnetic assembly and the induction coil assembly. In FIGS. 6A, 6B and 6C, 6D and 6E the induction coil assemblies 24 are mounted on and supported by a coil support structure 403 which may be attached (or coupled) to a central column 12 or shell 10. The segmented magnetic assemblies 22a, b, c, are mounted on and supported by a magnet support structure 405 which may be attached to the shell 10 or the column 12. Bearings 401 function to hold the coil and magnet assemblies apart maintaining the desired gap distance between the two assemblies. At the same time, the bearings 401 also aid in the movement of the two assemblies relative to each other. The bearings 401 may be circular (wheels) to permit easy travel. A possible configuration is shown in FIG. 2E in which the wheels can ride on a rail.

The manufacture of the gap maintaining structure is facilitated when the walls of the shell and column face and are parallel to each other. However, it should be appreciated that using the bearings 401 and segmenting the PMA enables the gap between the PMA and the ICA to be maintained even where the column is round and the walls of the shell and column are not plane parallel surfaces.

What is claimed is:

1. A wave energy converter (WEC) comprising:
a shell and a non-circular column; said shell having an outer wall and a central opening with a non-circular inner surface shaped to conform to the non-circular outer surface of the column for the positioning therein and the passing therethrough of said non-circular column and the shell and column being spaced apart to permit the shell and column to move up and down relative to each other when placed in a body of water and in response to the waves present in said body of water;
said non-circular column positioned within, and extending along, the central opening of the shell, the non-circular inner surfaces of the shell and the non-circular outer surfaces of the column being formed and shaped such that, when placed in a body of water and in response to waves in the body of water, rotational and twisting motion between the shell and the column is inhibited while the inner surfaces of the shell and the outer surfaces are spaced apart and extend along parallel spaced apart planes to permit unhindered vertical up and down motion of the shell relative to the column and
a power take off (PTO) device connected between the shell and column to convert the relative vertical motion between the shell and column due to the waves into electrical energy.

2. A WEC as claimed in claim 1, wherein the PTO is a linear electric generator including a permanent magnetic assembly (PMA) and an induction coil assembly (ICA), the PMA being attached to one surface of the shell and column and the ICA being connected to an opposite facing surface of the other one of the shell and column for producing electric energy, directly, when the shell and column move vertically, up and down, relative to each other, along parallel spaced apart planes.

3. A WEC as claimed in claim 1 wherein the column is a square column and the central opening of the shell is square; the sides of the columns defining plane surfaces parallel to plane surfaces of the central opening of the shell; and wherein anti-friction pads are positioned between the central opening of the shell and the column for maintaining the spacing between the shell and column when the shell and column move relative to each other and the anti-friction pads enabling free movement of the shell and column in the vertical direction.

4. A WEC as claimed in claim 3 wherein the PTO is a linear electric generator including a permanent magnetic assembly (PMA) and an induction coil assembly (ICA), the PMA being attached to one side of one of the shell and column and the ICA being connected to a corresponding, facing, side of the other one of the shell and column for producing electric energy, directly, when the shell and column move vertically, up and down, relative to each other.

5. A WEC as claimed in claim 4, further including means positioned between the PMA and the ICA for establishing a gap between them and for maintaining the gap relatively constant as the shell and column move relative to each other, along parallel spaced apart planes.

6. A WEC as claimed in claim 1 wherein the column is multi sided and wherein the central opening of the shell is multi-sided in a corresponding manner to the column, each side of the column defining a plane surface extending along the column and each side of the shell defining a plane surface parallel to a corresponding side of the column.

7. A WEC as claimed in claim 6, wherein the PTO is a linear electric generator including a permanent magnetic assembly (PMA) and an induction coil assembly (ICA), the PMA being attached to one surface of the shell and column and the ICA being connected to a corresponding surface of the other one of the shell and column for producing electric energy, directly, when the shell and column move vertically, up and down, relative to each other.

8. A WEC as claimed in claim 7, further including means positioned between the PMA and the ICA for establishing a gap between them and for maintaining the gap relatively constant as the shell and column move relative to each other.

9. A wave energy converter (WEC) comprising:
  a float and a column intended to be placed in a body of water with the float and column designed to move relative to each other as a function of the waves present in the body of water;
  the float having a central opening through which the column is positioned; the central opening being non-circular and the outer wall of the column being non circular and shaped so as to be parallel to the walls of the float's central opening, whereby rotational movement between the float and column is inhibited while allowing up and own motion.

10. A wave energy converter (WEC) as claimed in claim 9, wherein the central opening of the float is a square and the column is a square column whose outer walls stand opposite the inner walls of the float.

11. A wave energy converter (WEC) as claimed in claim 10, wherein one of a PMA and an ICA is formed along an outer wall of the column and the other one of the PMA and ICA is formed along the inner wall of the float for causing voltages to be generated across the induction coil assembly (ICA) when the PMA and the ICA mounted on the float and column move relative to each other within a given operating range defining an active power generating range.

* * * * *